United States Patent Office 3,691,022
Patented Sept. 12, 1972

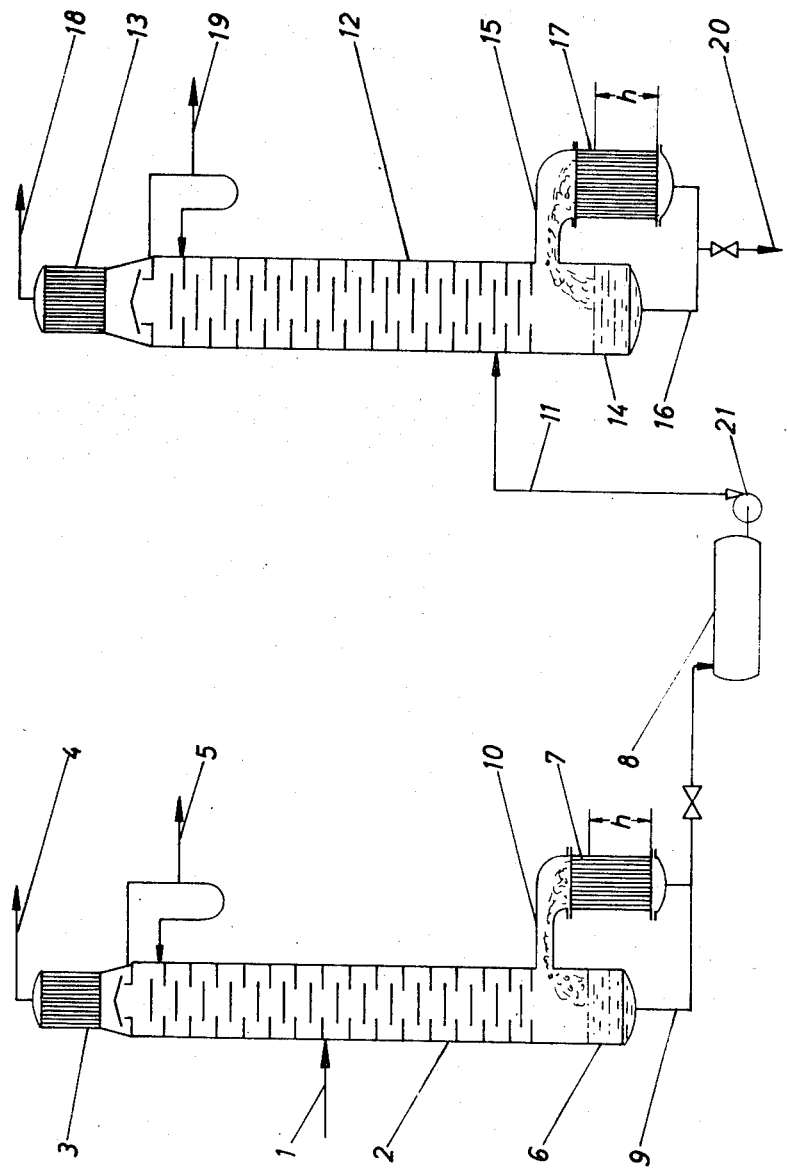

3,691,022
PROCESS FOR THE EVAPORATION OF PHTHALIC ANHYDRIDE FROM THE SUMP OF A DISTILLATION ZONE
Gerhard Keunecke, Geyen, and Johannes Krämer, Weiden, Germany, assignors to Chemiebau, Dr. A. Zieren GmbH & Co., KG, Cologne-Muengersdorf, Germany
Filed Dec. 15, 1969, Ser. No. 885,176
Claims priority, application Germany, Dec. 14, 1968,
P 18 14 774.5
Int. Cl. B01d 1/12; C07c 63/18
U.S. Cl. 203—71                              12 Claims

ABSTRACT OF THE DISCLOSURE

Crude phthalic anhydride produced by the oxidation of o-xylene is continuously distilled from the sump of a distillation column. Evaporation of the crude phthalic anhydride is effected in an evaporator which is in communication with the sump of the column by natural circulation from the bottom of the sump up through the evaporator and back to the sump. The crude phthalic anhydride leaving the evaporator has a concentration of at least fifty percent by weight of phthalic anhydride and trimellitic anhydride. The effective level of the crude phthalic anhydride in the evaporator is 30—100% of the length of the evaporator pipes.

BACKGROUND OF THE INVENTION

Phthalic anhydride (PA), employed on a large scale for the manufacture of plasticizers, alkyd resins and polyester resins, as well as varnish raw materials, is predominantly produced by air oxidation of o-xylene vapor at about 350—360° C. on $V_2O_5$-containing catalysts. From the vapor-phase reaction mixture, a crude PA is separated by cooling. This raw product contains, in addition to other by-products, small amounts of higher aromatic carboxylic acid anhydrides, particularly trimellitic acid anhydride, so that purification is required prior to further processing into the above-mentioned products.

Crude PA is distilled at temperatures of at least 200° C. Resins, which add to the already present high-boiling impurities, are formed at these temperatures. The resins are deposited on heat-exchange surfaces and result in incrustations thereon. Resulting deposits impair heat transfer and give rise to repeated disturbances in operation.

Incrustation of the heat-exchange surfaces in the continuous distillation of PA can be avoided by evaporating crude PA in thin-film evaporators only to such an extent that the PA content in the non-evaporated proportion is at least 80% by weight. Evaporation with the aid of thin-film evaporators is restricted to small plants, due to the limited evaporation efficiency of these devices, and is relatively expensive. The minimum content of 80% PA in the residue, required to avoid scale formation, necessitates maintaining considerable amounts of PA in the residue; the PA in the residue cannot be distilled over as a pure product, lest the operation of the thin-film evaporator be endangered by the formation of incrustations at the outlet end. The residue remaining during the separation of the pure product is only of minor value in spite of its content of more than 80% by weight of PA since the expense incurred to separate the PA from the residue is, in most cases, commercially excessive.

Phthalic anhydride is manufactured and sold in large quantities. Even slight increases in efficiency and/or purification result in sizable savings and a material commercial advantage in a highly competitive market.

SUMMARY OF THE INVENTION

Crude phthalic anhydride obtained from o-xylene is evaporated in an evaporator in communication by natural circulation with the sump of a column. The residue in the sump is composed of at least 50% by weight of PA and trimellitic anhydride discharged from the outlet of the evaporator. The effective level of material being processed in the evaporator is adjusted to from 30–100% of the heating pipe length.

A natural circulation evaporator is employed. It operates in accordance with the thermosiphon principle and consists essentially of a tube-nest heating unit connected with the sump of the column by means of a reflux pipe and an overflow pipe. The evaporator pipes of the tube nest are heated by a heating medium so that PA standing in the evaporator pipes is brought to boiling. Vapor bubbles which form in the evaporator pipes convey the boiling PA to the top in the pipes, as in a mammoth pump, from whence it flows back into the sump of the column by way of an overflow pipe. A return pipe connects the bottom of the column sump with the bottom of the heating unit. A pressure difference results from density differences between liquid PA at the inlet to the evaporator pipes and liquid-vapor mixture at the outlet of the evaporator pipes. Circulation of the liquid PA is thus effected.

The invention is directed to a safe process for evaporating phthalic anhydride. The process makes it possible to reduce the content of phthalic anhydride in evaporating sump residue and thus to increase the yield of pure phthalic anhydride without imparing evaporation by forming solid deposits on hot evaporator surfaces. Moreover, the process permits increased heat transfer, shorter residence time of the phthalic anhydride in the evaporation zone and thus a higher evaporation efficiency. The required capital outlay for the installation of the evaporator is reduced.

It is thus an object of this invention to increase the yield of phthalic anhydride (PA) from crude mixtures thereof and particularly from the product of o-xylene oxidation. A further object is to reduce or eliminate resinous and other incrustations on heat exchange surfaces during distillation of PA. Another object is to reduce the concentration of PA required to be maintained in residue, the purification of which is not feasible. A still further object is to provide a purification procedure for PA which requires a relatively small capital outlay and results in reduced operating costs and higher efficiency.

Upon further study of the specification and appended claims, other objects and advantages of the present invention will become apparent.

BRIEF DESCRIPTION OF DRAWING

The sole figure is a schematic diagram of series-connected columns for continuously distilling phthalic anhydride according to the present invention.

DETAILED DISCUSSION OF THE INVENTION

In the figure, two series-connected columns are shown, column 2 having 15 theoretical plates and column 12 having 14 theoretical plates. Although distillation can be effected according to the invention in a single column, as is apparent from the operation of column 2, per se, it is preferred to have at least two series-connected columns. Increasing the number of columns beyond two is not recommended, and two columns in series provides an efficient and effective operation.

Although columns 2 and 12 are illustrated as having 15 and 14 theoretical plates, respectively, the actual number of theoretical plates can vary from 10 to 18 for each of said columns.

The distillation columns may be of any conventional type, p.e. columns with trays.

It is also to be noted at this point that the following description of the invention is merely exemplary and is not intended to be limitative of the appended claims.

Crude PA, produced by o-xylene oxidation, is fed at 1 to a vacuum column 2 having 15 theoretical plates, which column carries a condenser 3. The sump 6 of the column 2 is in communication with a tube-next evaporator 7 by means of an overflow pipe 10 and a return pipe 9. The column is connected to a vacuum system by way of conduit 4 and is maintained under a slight subatmospheric pressure, i.e. at an absolute pressure from about 500 to 760 torr, preferably from about 550 to 600 torr (1 torr is 1 mm. Hg).

The crude phthalic anhydride which may be treated by the present invention has the following composition:

| | Percent by weight |
|---|---|
| Benzoic acid | 0.1–0.25 |
| Maleic anhydride | 0.2–0.40 |
| Trimellitic anhydride | 0.05–0.20 |
| Higher boiling substances | 0.1–0.40 |
| Phthalic anhydride | 99.0–99.40 |

A proportion of pure condensate of PA is withdrawn at 5; the remaining condensate is returned to column 2 as reflux. The amount of PA withdrawn at 5 is dependent upon the number of columns in operation, the degree of vacuum maintained in each column and the number of theoretical plates in each column. For commercial operation the purified product withdrawn from any column can vary from 99.0 to 99.6 percent by weight of the feed to that column. It is preferred that the product withdrawn from the final column be at least 99.0 percent by weight of the feed to that column.

Residue freed of readily volatile products is withdrawn into an intermediate tank 8 and pumped from there into vacuum column 12 by pump 21 through column 11. Column 12 carries a condenser 13 and is maintained under a pressure of from 100 to 250, preferably from 120 to 150, torr by vacuum line 18.

Column 12 is likewise equipped with a natural circulation evaporator 17, which is in communication with sump 14 of column 12 by way of a reflux line 16 and an overflow conduit 15.

The evaporator 17, like 7, comprises pipes through which the PA being treated is circulated. The effective amount of crude liquid PA in the pipes at any particular time may vary from 30 to 100, preferably from 45 to 75, percent by volume, based on the total capacity of said pipes. This percent by volume is indicated as $h$, which also represents the effective liquid level in terms of percent of the overall evaporator pipe length. The circulation ratio, i.e. the weight of the crude phthalic anhydride returning per minute as liquid from the evaporator to the bottom of the column divided by the weight of the vapor formed per minute in the evaporator, for each evaporator may vary from 5:1 to 40:1. In a two-column operation, the circulation ratio for the first column is preferably from 5:1 to 20:1, and that for the second column is preferably from 8:1 to 40:1.

From evaporator 17 the treated PA is recirculated to sump 14 through overflow 15. Conduit 16 returns the material being processed to evaporator 17, some of the residue being withdrawn through line 20. Purified PA is taken from the system from line 19, a portion of the condensate being continually returned as reflux.

PA flowing in the evaporator pipes from the bottom toward the top is first heated to boiling (temperature from 270° to 285° C. for the first evaporator and 225° to 250° C. for the second evaporator) in the lower section of the pipes. Thereafter, the evaporation zone is disposed wherein vapor bubbles are formed; these rise within the pipes and are enlarged during their ascent. In the upper section of the pipes, the vapor bubbles combine into a coherent vapor phase which occupies the interior of the pipes, whereas the liquid PA flows upwardly in the form of a layer having an annular cross section, adhering to the wall of the pipes, and exits in this form from the evaporator pipes.

A thermal fluid (thermal oil) is employed to heat the evaporator. The thermal fluid is circulated in contact with the outer surface of the evaporator tubes and may be any of the known thermal media suitable for maintaining a temperature in the range of from 310 to 340° C. Illustrative of such fluids are:

(1) Mixture of diphenyl oxide and diphenyl
(2) Mixture of triaryl dimethanes
(3) Alkylated diphenyl ether The danger of incrustation is gravest at the upper end of the evaporator pipes, since here the concentration of unevaporatable components in the liquid phase is highest. Due to unavoidable fluctuations in layer thickness of the liquid phase, it is possible for unwetted points to occur for a short time on the pipe wall and for thin deposits, which are not dissolved even when these points are wetted again to form thereat. It is most surprising that deposition of solid deposits at the upper end of the evaporator pipes is avoided as long as the sum of the proportions of PA and trimellitic anhydride in the liquid phase discharged from the evaporator pipes amounts to at least 50% by weight. In this connection, it is only the sum of the two anhydride proportions which is important; in individual cases the proportion of trimellitic anhydride can be small, for example between 2 and 20% by weight of the residue, as compared to that of the PA.

The sum of the PA and trimellitic anhydride in the evaporator effluent may vary from 50–95 percent by weight, based on the weight of the total evaporator effluent. The amount of PA may be as low as 25 percent by weight, based on the total weight of evaporator effluent.

The anhydrides have the effect of dispersing agents for the resin components and prevent the deposition thereof on the heat-exchange surfaces. In this connection, it is a prerequisite that the liquid phase leaves the evaporator pipes as a continuous annular stream. The virtual level of the PA is ascertained by a standpipe in communication with the bottom and with the lid of the evaporator. This virtual level is an operating characteristic, the magnitude of which is determinant of the efficiency of the evaporator. This characteristic is also influential on scale formation on the evaporator pipes. When maintaining a level of at least 30% of the length of the evaporator pipes, calculated from the lower inlet of the pipes, the wetting of the evaporator pipes at the upper outlet end is sufficient to prevent a precipitation of resinous components from the unevaporated liquid.

In accordance with the preferred embodiment of the process of this invention, the virtual level of the crude phthalic anhydride in the evaporator pipes of the natural circulation evaporator is adjusted to 45–75% of the length of the evaporator pipes. When maintaining this filling level, the incrustation of the evaporator pipes because of too extensive an evaporation is avoided, and a sufficient liquid circulation is achieved.

Suitably, the crude phthalic anhydride is evaporated during passage through the evaporator pipes to such a degree that the liquid phase exiting from these pipes contains 60–80% by weight of phthalic anhydride and trimellitic anhydride; the phthalic anhydride content is preferably between 30 and 60% by weight. When maintaining this concentration, avoidance of deposits on the heat-exchange surfaces for extended operating periods is well-assured.

Preferably, the evaporator is operated at a circulation ratio which is 5- to 40-fold, i.e. the amount by weight of the liquid phthalic anhydride flowing back from the evaporator into the sump of the column is 5 to 40 times the amount by weight of phthalic anhydride evaporated during one run through the evaporator. The speed of circulation of the liquid phase can be regulated by means of a throttle element disposed in the connection pipes between the evaporator and the sump of the column.

This throttle element may be an orifice plate. In this way, it is simultaneously possible to adjust the virtual height level required for a complete wetting of the evaporator pipes; the virtual level is increased as the content of phthalic anhydride and trimellitic anhydride in the liquid evaporator effluent decreases.

The crude phthalic anhydride is suitably evaporated in an evaporator having a proportion of evaporator pipe length: internal diameter of evaporator pipes of between 30 and 80. The evaporator pipe length is suitably from 1.5-4 meters, and the internal pipe diameter preferably ranges between 25 and 40 millimeters.

In accordance with a special embodiment of the invention, the crude phthalic anhydride is evaporated in an evaporator having a ratio of evaporator pipe length: internal evaporator pipe diameter of between 80 and 150, and circulation between the sump of the column and the evaporator is maintained by means of a pump, e.g. one similar to pump 21, disposed in the reflux pipes. In this embodiment, the circulation efficiency can be increased beyond the value attainable in case of natural circulation. Because of the increased circulation it is possible to employ evaporators having a higher pressure loss and a higher heating efficiency, without the formation of deposits at the run-off end of the evaporator pipes.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

By way of conduit 1, 278.4 parts by weight/hour of crude product is fed to column 2. An analysis of the crude product (prepared by oxidation of o-xylene) is:

| | Parts by weight |
|---|---|
| Phthalic anhydride | 99.2 |
| Benzoic acid | 0.2 |
| Maleic anhydride | 0.3 |
| Trimellitic anhydride | 0.1 |
| Higher boiling substances | 0.2 |
| Total | 100.0 |

A pressure of 550 torr is maintained within column 2. Evaporator 7 is heated with thermal oil, diphenyl-diphenyloxide, to maintain a temperature therein of from 270°–275° C., which is sufficient to boil the crude phthalic anhydride in the evaporator pipes. The boiling results in a natural circulation of the phthalic anhydride between sump 6 and evaporator 7.

Evaporator 7 is operated at an effective or virtual liquid level, $h$, of 70% and a circulation ratio of 8:1. The total length of evaporator tubes in evaporator 7 is 2.0 meters and the tubes have an internal diameter of 30 mm.

At 5, 2.9 parts by weight/hour of first run is withdrawn; the remaining condensate is returned by column 2 as reflux.

An analysis of the withdrawn first run reveals that it is 99.5% by weight phthalic anhydride.

From the evaporator cycle of column 1, 275.5 parts by weight/hour of resulting phthalic anhydride, freed of readily volatile products, is withdrawn into an intermediate tank 8 and pumped from there into a second vacuum column 12 by means of pump 21 through conduit 11.

The column 12 carries a condenser 13 and is maintained under a pressure of about 60 torr by the vacuum line 18.

The natural circulation evaporator 17 is operated at a virtual level, $h$, of 70% and a circulation ratio of 12:1. At 19, 224.5 parts by weight/hour is withdrawn.

The total length of evaporator tubes in evaporator 17 is 2.0 meters and the tubes have an internal diameter of 30 mm.

From the cycle of evaporator 17, one part by weight/hour of residue, consisting of 50% by weight of phthalic anhydride, 10% by weight of trimellitic anhydride and 40% by weight of higher-boiling components, is withdrawn at 20.

After an operating period of 10 weeks, the evaporator 17 was taken out of service to determine whether incrustations had been formed at the outlet end of the evaporator pipes. During this examination, no deposits were observed. After an operating time of 6 months, no decrease in the heating efficiency of the evaporator could be detected. The yield in pure phthalic anhydride, based on the charge in the second distillation stage, amounted to about 99.6% by weight, whereas, when employing a thin-film evaporator, the thus-obtained yield was about 98.5% by weight.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for purifying crude phthalic anhydride produced from o-xylene and containing trimellitic anhydride as an impurity which comprises continuously fractionally distilling the crude phthalic anhydride in a distillation column having a head and a sump to obtain a head product of purified phthalic anhydride and a sump residue of phthalic anhydride, trimellitic anhydride and high boiling impurities; maintaining continuous liquid circulation from the bottom of the sump up through a long tube vertical evaporator and back to the sump; vaporizing a portion of the liquid circulating through the evaporator; withdrawing a stream of liquid from the top of the evaporator, said withdrawn liquid containing trimellitic anhydride and 30–60% by weight of phthalic anhydride, the sum of phthalic anhydride and trimellitic anhydride being at least 50% by weight of said total withdrawn liquid stream; and maintaining an effective level of liquid crude phthalic anhydride in the evaporator equivalent to from 45–75% of the length of the tubes in said evaporator.

2. A process according to claim 1 wherein the residue from the sump of the first column is introduced as feed for a second column.

3. A process according to claim 1 wherein the continuous liquid circulation from the bottom of the sump up through the evaporator and back to the sump is a natural circulation comprising the flow of the liquid crude phthalic anhydride through the evaporator pipes.

4. A process according to claim 1 which comprises evaporating the crude phthalic anhydride passing through the evaporator to such an extent the liquid withdrawn from the evaporator contains from 60–80% by weight of the sum of phthalic anhydride and trimellitic anhydride.

5. A process according to claim 1 which comprises maintaining the circulation ratio from 5- to 40-fold in the evaporator.

6. A process according to claim 1 which comprises adjusting the liquid circulation by throttling the latter in a zone between the evaporator and the sump.

7. A process according to claim 1 wherein the evaporator has a ratio of evaporator pipe length to internal evaporator pipe diameter of 30:1 to 80:1.

8. A process according to claim 1 wherein the evaporator has a ratio of evaporator pipe length to internal evaporator diameter of 80:1 to 150:1 and forced circulation is employed between the sump and the evaporator.

9. A process as defined by claim 1 wherein said liquid withdrawn from the top of the evaporator is in the form of an annular stream.

10. A process as defined by claim 1 wherein said fractionally distilling is conducted at a pressure of about 500–760 mm. Hg absolute.

11. A process as defined by claim 2, the first column having a circulation ratio of 5:1 to 20:1 and the second column having a circulation ratio of 8:1 to 40:1.

12. A process as defined by claim 11 wherein each column has 10–18 theoretical plates.

References Cited

UNITED STATES PATENTS

| | | | |
|---|---|---|---|
| 2,534,173 | 12/1950 | Kraft | 202—153 |
| 2,574,644 | 11/1951 | Landau | 260—346.7 |
| 2,670,325 | 2/1954 | West et al. | 260—346.7 |
| 2,786,805 | 3/1957 | Sullivan et al. | 260—346.7 |
| 2,795,536 | 6/1957 | Grossberg | 202—153 |
| 3,187,016 | 6/1965 | Brown et al. | 260—346.7 |
| 3,380,896 | 4/1968 | Scheiber et al. | 203—77 |
| 2,795,536 | 6/1957 | Grossberg et al. | 202—153 |
| 3,177,129 | 4/1965 | Huckins | 202—153 |
| 3,309,295 | 3/1967 | Cahn et al. | 202—153 |
| 3,442,767 | 5/1969 | Hall | 202—153 |

WILBUR L. BASCOMB, JR., Primary Examiner

U.S. Cl. X.R.

203—73, 98; 260—346.7; 202—153